US012359585B1

(12) United States Patent
Campbell et al.

(10) Patent No.: US 12,359,585 B1
(45) Date of Patent: Jul. 15, 2025

(54) DUAL PIN SUPPORT FOR BLADE OUTER AIR SEAL AND METHOD

(71) Applicant: RTX CORPORATION, Farmington, CT (US)

(72) Inventors: Christian X Campbell, West Hartford, CT (US); Cheng Gao, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/952,223

(22) Filed: Nov. 19, 2024

(51) Int. Cl.
*F01D 11/08* (2006.01)
*F01D 25/24* (2006.01)

(52) U.S. Cl.
CPC ............ *F01D 11/08* (2013.01); *F01D 25/246* (2013.01); *F05D 2240/11* (2013.01); *F05D 2260/30* (2013.01); *F05D 2300/6033* (2013.01)

(58) Field of Classification Search
CPC ........ F01D 11/08; F01D 25/246; F01D 25/24; F05D 2240/11; F05D 2260/30; F05D 2260/31
See application file for complete search history.

(56) References Cited

U.S. PATENT DOCUMENTS

| | | | | |
|---|---|---|---|---|
| 4,251,185 | A * | 2/1981 | Karstensen | F01D 11/08 415/113 |
| 6,884,026 | B2 | 4/2005 | Glynn et al. | |
| 7,950,234 | B2 | 5/2011 | Radonovich et al. | |
| 8,118,546 | B2 | 2/2012 | Morrison | |
| 9,587,517 | B2 | 3/2017 | Vetters et al. | |
| 10,590,803 | B2 * | 3/2020 | Quennehen | F01D 11/122 |
| 11,492,978 | B2 * | 11/2022 | Lutjen | F02C 7/28 |

* cited by examiner

*Primary Examiner* — Eldon T Brockman
(74) *Attorney, Agent, or Firm* — Miller, White, Zelano & Branigan, P.C.; Christopher B. Kilner

(57) ABSTRACT

A ceramic matrix composite (CMC) blade outer air seal (BOAS) assembly includes a CMC BOAS including a base and a pair of rails having a substantially π-shaped cross-section. The pair of rails include a first pair of aligned holes at a first end and second pair of aligned holes at a second end. A first pair of parallel metallic pins have a first end connected to a first central support pin and a second end connected to a second central support pin, respectively, wherein the first pair of parallel metallic pins are configured to engage the first pair of aligned holes. A second pair of parallel metallic pins also have a first end connected to a first central support pin and a second end connected to a second central support pin, respectively, wherein the second pair of parallel metallic pins are configured to engage the second pair of aligned holes.

20 Claims, 4 Drawing Sheets

DUAL PIN SUPPORT FOR BLADE OUTER AIR SEAL AND METHOD

FIELD OF THE INVENTION

The subject matter disclosed herein relates to attachment hardware for supporting a blade outer air seal (BOAS) of a turbine and, in particular, to a dual pin blade outer air seal (BOAS) support for a Ceramic Matrix Composite (CMC) BOAS and method thereof.

BACKGROUND OF THE INVENTION

Turbine blades, vanes, and BOAS made from high-temperature capable Ceramic Matrix Composites (CMCs) can increase turbine efficiency by reducing cooling air requirements. Silicon Carbide (SiC) based CMCs fabricated via Chemical Vapor Infiltration (CVI), Melt Infiltration (MI), Polymer Infiltration and Pyrolysis (PIP), and hybrids of CVI/MI and CVI/PIP possess high temperature capability. CMC components are fabricated from a near-net shape fiber preform, typically formed from fabric and tow layups.

An important aspect of CMC technology is how CMC components interface with metal components at attachments. Typical CMC attachments include hooks, contact pads, wedge supports and pins. Pin attachments have been proven to be a reliable attachment concept for BOAS and are a focus of CMC BOAS development.

A pin attachment is typically designed by a first order calculation of the pin load relative to the Net Shear, Net Tensile and Net Bearing area. A CMC pin loaded attachment must meet strength, creep strength, and environmental stress rupture allowables. For a BOAS pin design, the holes are in cool locations of the part, so creep is typically not an issue. However, loads tend to be relatively high due to pressure loads and the pin holes tend to be pushed toward the edge to the rail due to packaging constraints, which decreases net shear area. Therefore, BOAS pin attachments tend to be net shear limited.

For example, as shown in FIGS. 1A and 1B, a pin loaded BOAS 100 may have a base 110, a pair of rails 120 having a width t, and a pair of holes 135 at each end of the rails 120 through which a pin 130 may be used to attach the BOAS 100 to a support 140. The positioning of holes 135 may be excluded from a zone 125. For example, when the base 110 of BOAS 100 is exposed to a hot stream, an intermediate temperature area is formed on rails 120, and the positioning of holes 135 should not occur in this intermediate temperature area that may define at least a portion of zone 125, which limits the dimension e in FIG. 1B. Additionally, as illustrated in FIG. 1A, the dimension e and the positioning of holes 135 and supports 140 may be limited by the space required by additional structures associated with the CMC BOAS 100, such as a sealing feature having seal housing 112 and W-seal 114, which may also define a least a portion of zone 125 and limit the dimension e in FIG. 1B. The shear net section 150 for each pin 130 equals 2 times the distance e from the center of hole 135 to the top of rail 120 times the width t of the rail 120:

Shear Net Section=2·e·t

The shear stress equals the pin load divided by the shear net section:

Shear Stress=Pin Load/Shear Net Section

The load carrying capability is equal to the shear strength times the shear net section:

Load Carrying Capability=Shear Strength. Shear Net Section

Thus, while it would be desirable to increase the distance e from the center of hole 135 to the top of rail 120 to increase the shear net section 150, this distance e is limited by intermediate temperature zone 125. Increasing the rail width t to increase the shear net section 150 may also be limited by weight and packaging concerns.

Additionally, intermediate temperature oxidation of the CMC, known as pesting, around the pin holes 130 is particular concern for BOAS pin attachments. Pesting occurs when a Boron Nitride (BN) interface coating is exposed to an oxidizing environment at a temperature where the $B_2O_3$ glass does not flow to seal open matrix crack. Pesting is greatly accelerated in regions of high stress, for example at a stress concentration around a pin hole 130. Therefore, pin loads may need to be reduced significantly below strength allowables due to pesting concerns.

The above information disclosed in this Background section is only for understanding of the background of the inventive concepts and, therefore, it may contain information that does not constitute prior art.

SUMMARY OF THE INVENTION

The present disclosure is directed, in a first aspect, to a ceramic matrix composite (CMC) blade outer air seal (BOAS) assembly. The assembly includes a CMC BOAS including a base and a pair of rails having a substantially π-shaped cross-section, wherein the pair of rails include a first pair of aligned holes at a first end and second pair of aligned holes at a second end. The assembly also includes a first pair of parallel metallic pins having a first end connected to a first central support pin and a second end connected to a second central support pin, respectively, wherein the first pair of parallel metallic pins are configured to engage the first pair of aligned holes, and a second pair of parallel metallic pins having a first end connected to a first central support pin and a second end connected to a second central support pin, respectively, wherein the second pair of parallel metallic pins are configured to engage the second pair of aligned holes.

In an embodiment of the assembly, the respective first and second central support pins may be aligned on a first axis and configured to rotate about the first axis when disposed in respective support holes.

In another embodiment of the assembly, at least one of the first end and the second end of the first or second parallel metallic pins may be attached to a support plate that is attached to one of the respective first and second central support pins.

In a further embodiment of the assembly, at least one of the first end and the second end of the first or second pair of parallel metallic pins may be integrally attached to one of the respective first and second central support pins.

In yet another embodiment of the assembly, the first and second pairs of parallel metallic pins may be configured for rotation about their respective first and second central support pins.

The present disclosure is also directed, in a second aspect, to a dual pin loaded blade outer air seal (BOAS). The apparatus includes: a ceramic matrix composite (CMC) BOAS base having a first end and a second end; a pair of CMC BOAS rails extending transversely from the CMC BOAS base, the CMC BOAS rails being substantially parallel and extending from the first end to the second end, with each CMC BOAS rail having a first pair of holes adjacent the first end and a second pair of holes adjacent the second end; a first metallic rotatable support engaging each of the first pair of holes; and a second metallic rotatable support engaging each of the second pair of holes. Each of the first and second rotatable metallic supports includes: a first central support pin and a second central support pin disposed on a first axis, the first and second central support pins configured to rotate about the first axis when engaged within respective holes on a support; and a pair of parallel pins having a first end connected to the first central support pin and a second end connected to the second central support pin, respectively, wherein the pair of parallel pins are configured to engage a respective pair of holes in each CMC BOAS rail.

In an embodiment of the apparatus, the pair of parallel pins may have respective axes in a plane that includes the first axis.

In another embodiment of the apparatus, at least one of the first end and the second end of the parallel pins may be attached to a support plate that is attached to one of the first and second central support pins.

In a further embodiment of the apparatus, at least one of the first end and the second end of the parallel pins may be integrally attached to one of the first and second central support pins.

In yet another embodiment of the apparatus, the first end of the parallel pins may be integrated with the first central support pin, the second end of the parallel pins may be integrated with the second central support pin, and a joint may be disposed on the parallel pins between the first and second ends.

In an embodiment of the apparatus, the joint may be selected from a group consisting of a welded joint, a braised joint, and a threaded joint.

In a further embodiment of the apparatus, each joint may include a coupling nut with oppositely threaded ends for engaging corresponding threads on a respective parallel pin section.

In yet another embodiment of the apparatus, the first ends of the parallel pins may be attached to a first support plate that is attached to the first central support pin, and the second ends of the parallel pins may be attached to a second support plate that is attached to the second central support pin.

In an embodiment of the apparatus, the parallel pins, support plates, and central support pins may be attached to each other by welds.

In a further embodiment of the apparatus, the parallel pins, support plates, and central support pins may be attached to each other by braised joints.

The present disclosure is further directed, in a third aspect, to a method of supporting a ceramic matric composite (CMC) blade outer air seal (BOAS, wherein the CMC BOAS has a substantially π-shaped cross-section with a base and a pair of rails. The method Includes: providing an aligned pair of holes in first and second ends of the rails, the aligned pairs of holes being disposed outside of an intermediate temperature zone adjacent the base; providing a first pair of parallel metallic pins extending through the aligned pair of holes in the first end of the rails; providing a second pair of parallel metallic pins extending through the aligned pair of holes in the second end of the rails; supporting the first and second ends of the first pair of parallel metallic pins with axially-aligned first central support pins; and supporting the first and second ends of the second pair of parallel metallic pins with axially-aligned second central support pins. In the method, the axially-aligned first and second central support pins are disposed parallel to each other and are configured to permit rotation of the first and second pairs of parallel metallic pins in response to thermal bending of the CMC BOAS.

In an embodiment, the method may further include supporting the axially-aligned first and second central support pins within support holes of a support structure.

In another embodiment of the method, supporting the first ends of the first pair of parallel metallic pins with one of the axially-aligned first central support pins may include attaching the first ends of the first pair of parallel metallic pins to extend from one side of a metallic plate and attaching the axially-aligned first central support pin to extend from a second side of the metallic plate.

In a further embodiment of the method, supporting the second ends of the first pair of parallel metallic pins with another of the axially-aligned first central support pins may include attaching the second ends of the first pair of parallel metallic pins to extend from one side of a second metallic plate and attaching the other axially-aligned first central support pin to extend from a second side of the second metallic plate.

In yet another embodiment of the method, supporting the second ends of the first pair of parallel metallic pins with another of the axially-aligned first central support pins may include forming the second ends of the first pair of parallel metallic pins integrally with the other axially-aligned first central support pin.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1A:
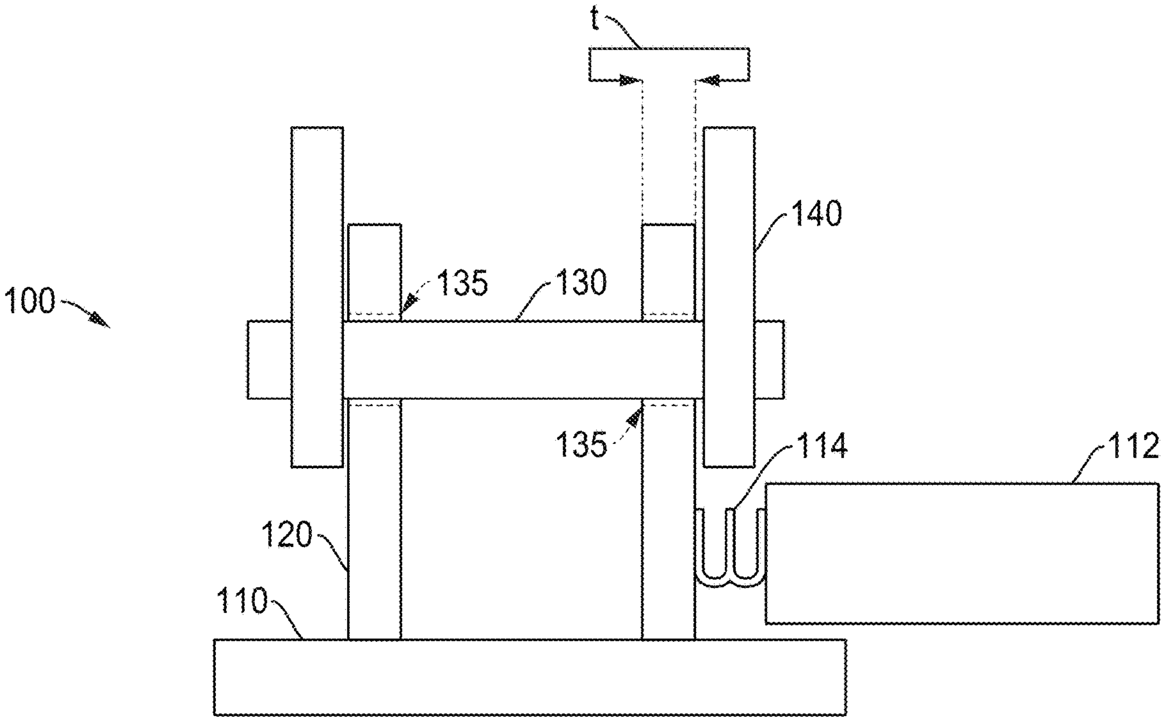
FIG. 1A is a schematic end view of a pinned BOAS connection in accordance with the prior art.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms “a,” “an,” and “the” include plural referents unless otherwise specified, and that the terms “includes” and/or “including,” when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references “upper” and “lower” are relative and used only in the context to the other, and are not necessarily “superior” and “inferior.”

It will further be understood that, although the terms “first,” “second,” “third,” and the like may be used herein to describe various elements, these elements should not be limited by these terms. These terms are only used to distinguish one element from another element. Thus, “a first element” discussed below could be termed “a second element” or “a third element,” and “a second element” and “a third element” may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed, in a first aspect, to a ceramic matrix composite (CMC) blade outer air seal (BOAS) that uses a dual pin assembly in place of single pins to support each side of the CMC BOAS.

Figure 2A:
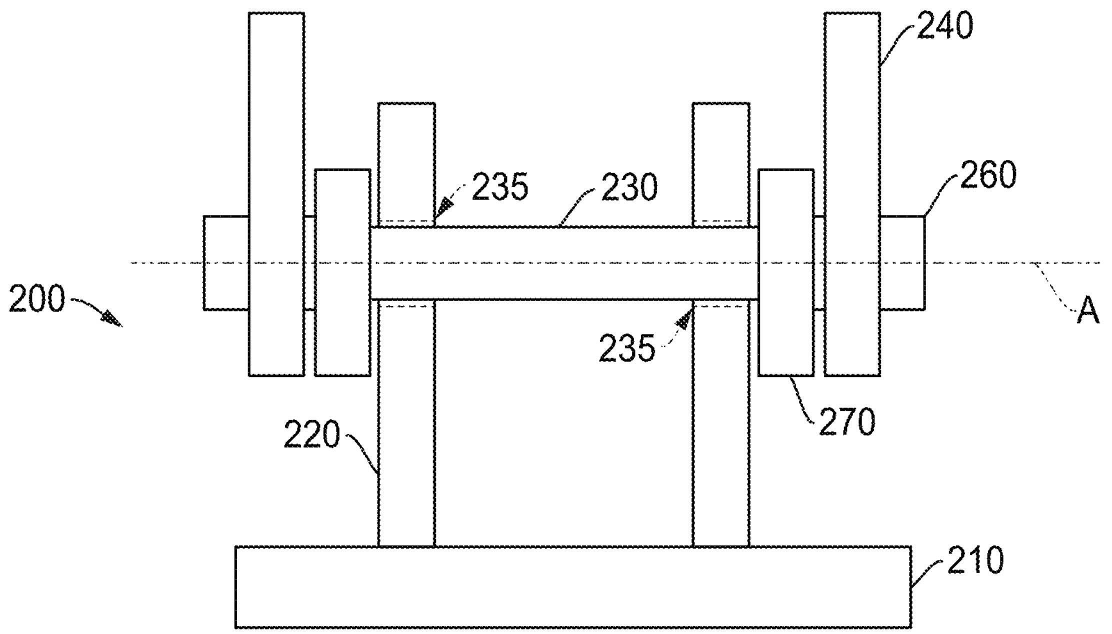
FIG. 2A is a schematic end view of a first embodiment of a dual pin loaded BOAS connection in accordance with the present disclosure.
Figure 2B:
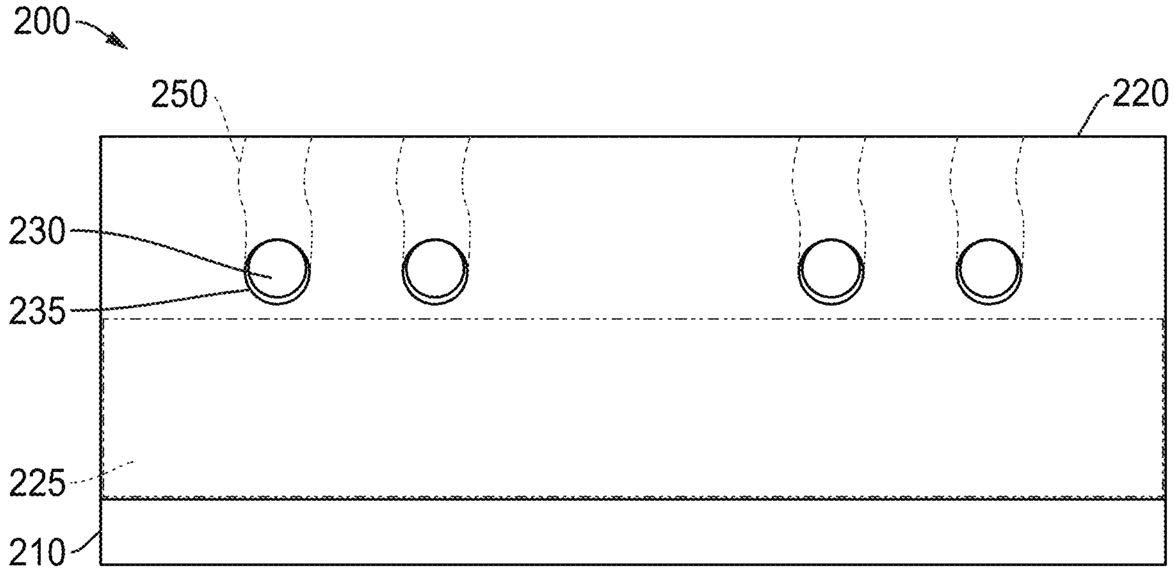
FIG. 2B is a schematic side view of the first embodiment of a dual pin loaded BOAS connection in accordance with the present disclosure.

With reference to FIGS. 2A and 2B, a CMC BOAS 200 may include a base 210 and a pair of rails 220. In an embodiment, the rails 220 may extend from the base 210 so as to have a substantially (inverted) π-shaped cross-section, as shown in FIG. 2A.

Each of the pair of rails 220 include a first pair of holes 235 at a first end, such as on the left side in FIG. 2B, and second pair of holes 235 at a second end, such as the right side in FIG. 2B. The holes 235 in the first end of one rail 220 are aligned with the holes 235 in the first end of the other rail 220 so as to form a first pair of aligned holes 235 at the first end. Likewise, the holes 235 in the second end of one rail 220 are aligned with the holes 235 in the second end of the other rail 220 so as to form a second pair of aligned holes 235 at the second end. Holes 235 may be formed in the rails 220 of CMC BOAS 200 in any suitable manner and may be formed in the preform and/or machined into the densified CMC.

Figure 1B:
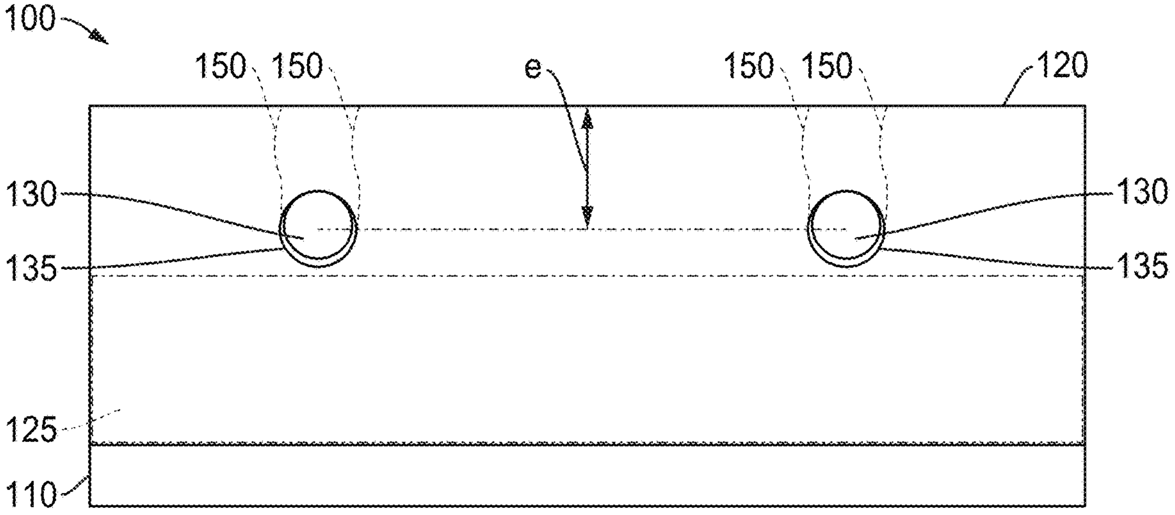
FIG. 1B is a schematic side view of a pinned BOAS connection in accordance with the prior art.

By using a pair of aligned holes 235 rather than a single hole 135 as in FIGS. 1A and 1B, the shear net section 250 supporting each end of the rails 220 may be more than double that of shear net section 150 supporting each end of the rails 120. In addition to doubling this value by doubling the number of holes 235 as compared to 135, holes 235 may be smaller than holes 135, and when positioned with a lower edge next to the intermediate temperature zone 225, the smaller diameter of holes 235 permits a larger distance e from the center of hole 235 to the top of rail 220.

A set of dual pin assemblies are used to support the CMC BOAS 200. Specifically, a first pair of parallel metallic pins 230 have a first end connected to a first central support pin 260 and a second end connected to a second central support pin 260, respectively, wherein the first pair of parallel metallic pins 230 are configured to engage the first pair of aligned holes 235. Similarly, a second pair of parallel metallic pins 230 have a first end connected to a first central support pin 260 and a second end connected to a second central support pin 260, respectively, wherein the second pair of parallel metallic pins 230 are configured to engage the second pair of aligned holes 235.

As shown in FIG. 2A, the respective first and second central support pins 260 are aligned on a first axis A and configured to rotate about the first axis A when disposed in respective support holes in support plate 240 of the turbine engine. Thus, each dual pin assembly can rotate around the first and second central support pins 260.

In the embodiment of FIG. 2A, each of the first end and the second end of the first and second parallel metallic pins 230 is attached to a support plate 270 that is attached to one of the respective first and second central support pins 260. Accordingly, the first and second pairs of parallel metallic pins 230 are thus configured for rotation about their respective first and second central support pins 260 due to the rotation of support plate 270.

Figure 3:
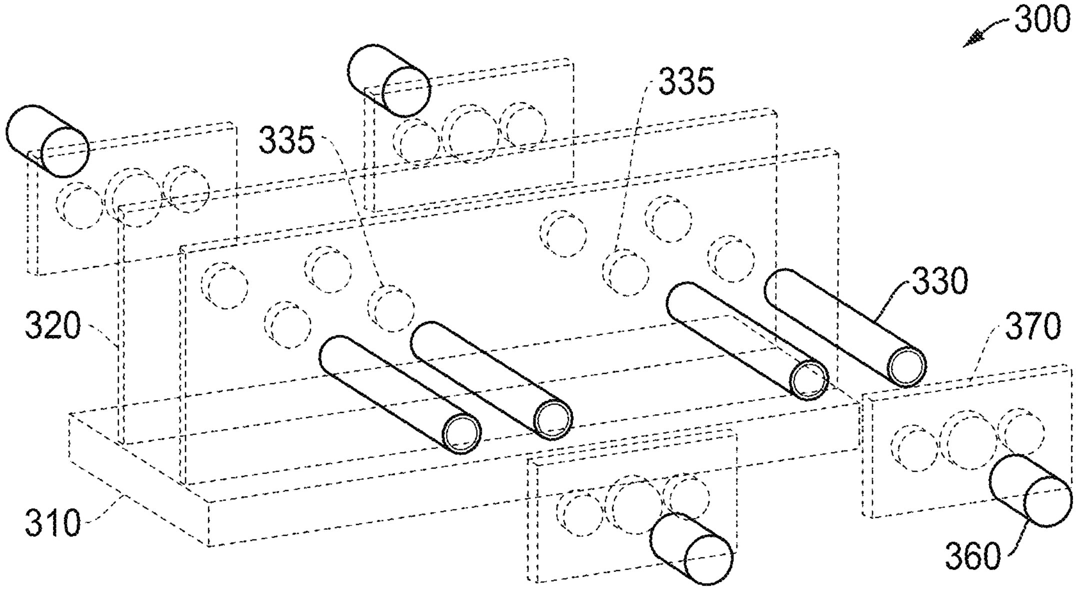
FIG. 3 is an exploded perspective view of the first embodiment of a dual pin loaded BOAS connection in accordance with the present disclosure.

Referring to FIG. 3, an exploded perspective view of the embodiment of FIGS. 2A and 2B without engine support plate 240 is illustrated to show a dual pin loaded blade outer air seal (BOAS) 300.

Dual pin loaded BOAS 300 includes a CMC BOAS 310 base having a first end and a second end and a pair of CMC BOAS rails 320 extending transversely from the CMC BOAS base 310. The CMC BOAS rails 320 are substantially parallel and extend from the first end to the second end, with each CMC BOAS rail 320 having a first pair of holes 335 adjacent the first end and a second pair of holes 335 adjacent the second end.

A first metallic rotatable support engages each of the first pair of holes 335, and a second metallic rotatable support engages each of the second pair of holes 335. Each of the first and second rotatable metallic supports includes a first central support pin 360 and a second central support pin 360 disposed on a first axis, with the first and second central support pins 360 configured to rotate about the first axis when engaged within respective holes on a support.

The first and second rotatable metallic supports also include a pair of parallel pins 330 having a first end connected to the first central support pin 360 and a second end connected to the second central support pin 360, respectively, wherein the pair of parallel pins 330 are configured to engage a respective pair of holes 335 in each CMC BOAS rail 320. The pairs of parallel pins 330 may have respective axes in a plane that includes the first axis of the central support pins.

In the embodiment of FIG. 3, each of the first end and the second end of the parallel pins 330 is attached to a support plate 370 that is attached to one of the first and second central support pins 360. For example, the first ends of the parallel pins 330 may be attached to a first support plate 370 that is attached to the first central support pin 360, and the second ends of the parallel pins 330 may be attached to a second support plate 370 that is attached to the second central support pin 360. In one or more embodiments the parallel pins 330, support plates 370, and central support pins 360 may be formed of a compatible high temperature resistant metal (i.e., non-nickel metals for CMC compatibility) and be attached to each other by welds. In other embodiments, the parallel pins 330, support plates 370, and central support pins 360 may be attached to each other by braised joints. In certain embodiments, threaded attachments may also be possible.

Figure 4:
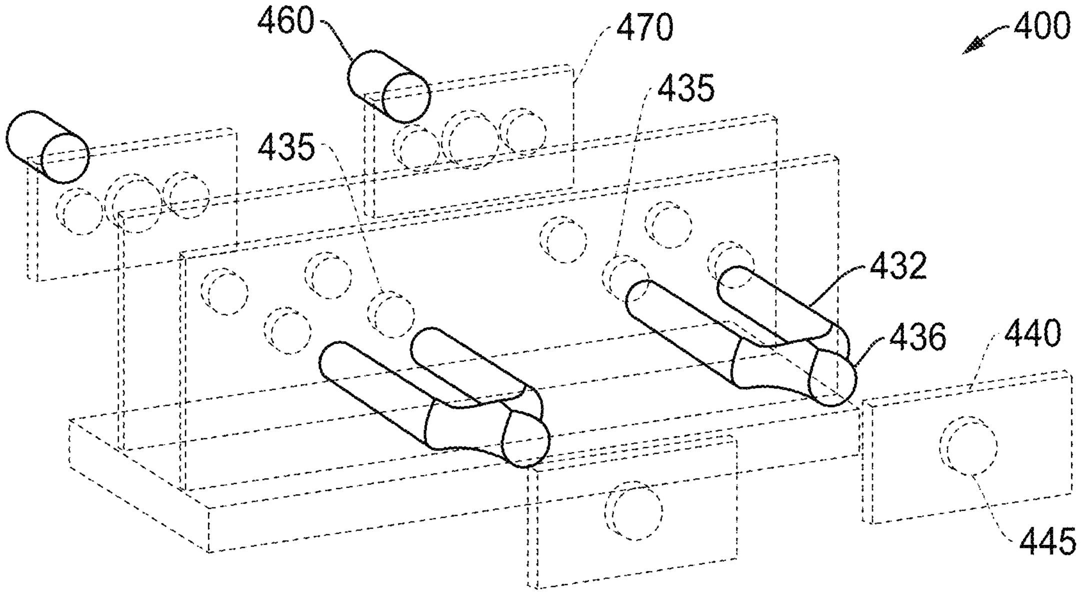
FIG. 4 is an exploded perspective view of a second embodiment of a dual pin loaded BOAS connection in accordance with the present disclosure.

Referring to FIG. 4, an exploded perspective view of another embodiment with one of the engine support plates 440 is illustrated to show another dual pin loaded blade outer air seal (BOAS) 400.

Dual pin loaded BOAS 400 includes a CMC BOAS 410 base having a first end and a second end and a pair of CMC BOAS rails 420 extending transversely from the CMC BOAS base 410. The CMC BOAS rails 420 are substantially parallel and extend from the first end to the second end, with each CMC BOAS rail 420 having a first pair of holes 435 adjacent the first end and a second pair of holes 335 adjacent the second end.

A first metallic rotatable support engages each of the first pair of holes 435, and a second metallic rotatable support engages each of the second pair of holes 435. Each of the first and second rotatable metallic supports includes a first central support pin 436 and a second central support pin 460 disposed on a first axis, with the first central support pin 436 and second central support pin 460 configured to rotate about the first axis when engaged within respective holes 445 on a support plate 440 of the turbine engine.

The first and second rotatable metallic supports also include a pair of parallel pins 432 having a first end integrally formed with the first central support pin 436 and a second end connected to the second central support pin 460, respectively, wherein the pair of parallel pins 432 are configured to engage a respective pair of holes 435 in each CMC BOAS rail 420. The pairs of parallel pins 432 may have respective axes in a plane that includes the first axis of the central support pins 436 and 460.

In the embodiment of FIG. 4, the second end of the parallel pins 432 is attached to a support plate 470 that is attached to one of the second central support pin 360. For example, the first ends of the parallel pins 432 may be integrated with the first central support pin 436, and the second ends of the parallel pins 432 may be attached to a support plate 470 that is attached to the second central support pin 460. In one or more embodiments the second ends of the parallel pins 432, support plate 370, and central support pin 360 may be formed of a compatible high temperature resistant metal (i.e., non-nickel metals for CMC compatibility) and be attached to each other by welds. In other embodiments, the second end of the parallel pins 432, support plate 370, and central support pin 360 may be attached to each other by braised joints.

By having two parallel pins 432 integrally joined to the first central support pin 436 on the first side, the second side may be open to allow for assembly. Further, fewer separate parts may be involved.

Figure 5:
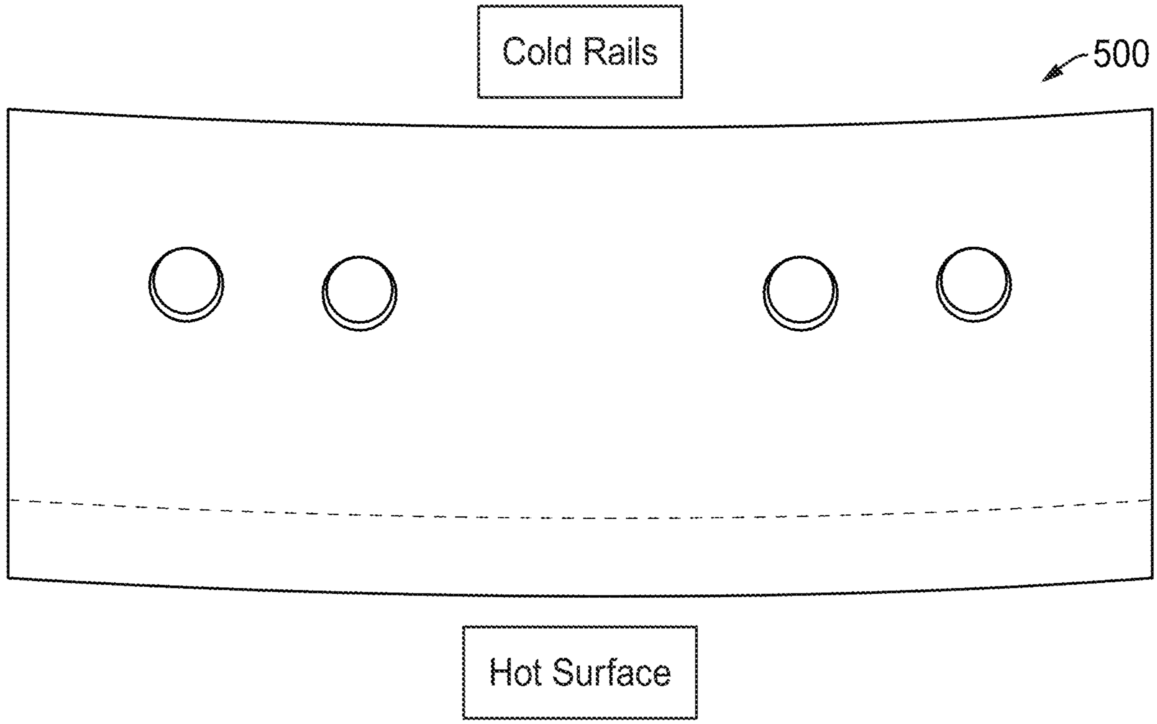
FIG. 5 is a side view of a temperature-warped dual pin loaded BOAS in accordance with the present disclosure.

In each of the embodiments of FIGS. 2A, 2B, 3, and 4, the dual pin assembly may rotate about the axis of the central support pins 260, 360, and/or 436, which allows for a uniform load distribution to both of the parallel pins 230, 330, 432. Additionally, as shown in FIG. 5, such independent rotation about the axis of the central support pins 260, 360, and/or 436 at either side of CMC BOAS 500 can accommodate the expected thermal bowing of the CMC BOAS 500 due to the hot surface on one side and the cold rails on the other.

As illustrated by the differences between FIG. 1A and FIG. 2A, the use of a dual pin assembly may present more challenges with respect to packaging because more space used by support plate 270, 370, or 470 and/or central support pin 260, 360, or 436. Various methods to address the packaging issues are included within the scope of the present disclosure, including but not limited to having engine support plates 240 or 440 and a single, two-sided support pin 260, 460, or 436, and/or support plates 270, 470 disposed between the rails 220 or 420 with discontinuous parallel pins 230 or 432 extending outward through the holes 235 or 435 in rails 220 or 420.

Figure 6:
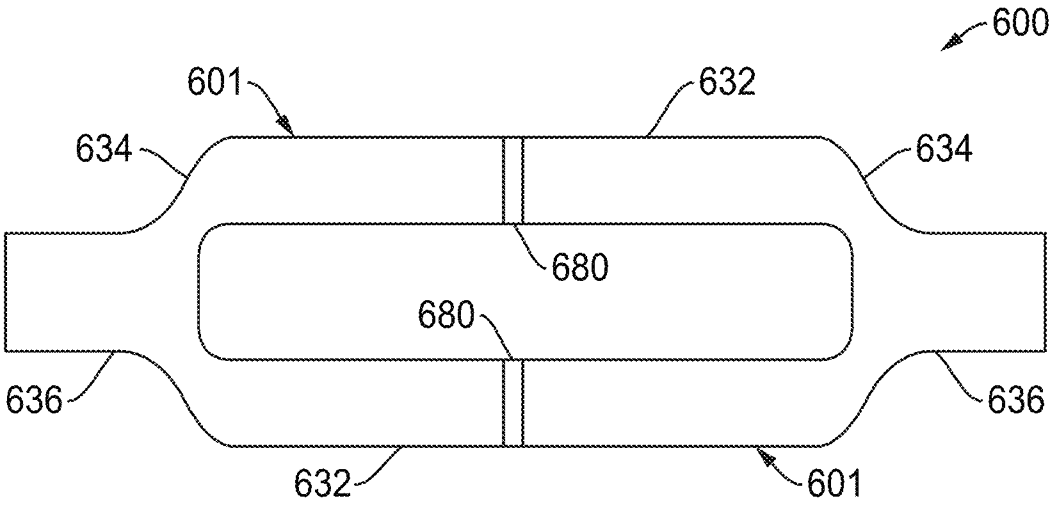
FIG. 6 is a top view of an alternate embodiment of a dual pin structure in accordance with the present disclosure.

A further embodiment within the scope of the present disclosure is illustrated in FIG. 6. As with the embodiment of FIG. 4, the parallel pins 632 may be formed integrally with the central support pin 636, such as by being connected via a shoulder portion 634. However, in this further embodiment, the second ends of parallel pins 632 of one "wishbone" element 601 are connected to the second ends of parallel pins 632 of another wishbone element 601 via a joint 680 disposed between the rails of the CMC BOAS in order to form a dual pin assembly 600. Thus, in an embodiment, the first end of the parallel pins 632 may be integrated with the first central support pin 636, the second end of the parallel pins 632 may be integrated with the second central support pin 636, and a joint 680 may be disposed on the parallel pins 632 between the first and second ends.

In an embodiment, the joint 680 may be a weld that joins the second ends of parallel pins 632. In another embodiment, the joint 680 may be a brazed interface between the second ends of parallel pins 632. In a further embodiment, the joint 680 may be a threaded coupling. In one example, the second ends of parallel pins 632 may include oppositely-oriented external threads and a nut with oppositely-oriented internal threads may be used to join the second ends of parallel pins 632. In another example, the second ends of parallel pins 632 may include oppositely oriented internally-threaded holes and a nut with oppositely-oriented external-threaded screws extending from two axial sides may be used to join the second ends of parallel pins 632.

The present disclosure is directed, in another aspect, to a method of supporting a CMC BOAS 200, 300, or 400 having a substantially π-shaped cross-section with a base 210, 310, or 410 and a pair of rails 220, 320, or 420.

The method includes providing an aligned pair of holes 235, 335, or 435 in first and second ends of the rails 220, 320, or 420, the aligned pairs of holes 235, 335, or 435 being disposed outside of an intermediate temperature zone 225 adjacent the base 210. The holes 235, 335, or 435 may be machined into a preform and/or a densified CMC rail 220, 320, or 420.

The method also includes providing a first pair of parallel metallic pins 230, 330, 432 extending through the aligned pair of holes 235, 335, or 435 in the first end of the rails 220, 320, or 420, and providing a second pair of parallel metallic pins 230, 330, or 432 extending through the aligned pair of holes 235, 335, or 435 in the second end of the rails 220, 320, or 420.

The method further includes supporting the first and second ends of the first pair of parallel metallic pins 230, 330, or 432 with axially-aligned first central support pins 260, 360, or 436/460, and supporting the first and second ends of the second pair of parallel metallic pins 230, 330, or 432 with axially-aligned second central support pins 260, 360, or 436/460, wherein the axially-aligned first and second central support pins 260, 360, or 436 and 460 are disposed parallel to each other and are configured to permit rotation of the first and second pairs of parallel metallic pins 230, 330, or 432 in response to thermal bending of the CMC BOAS 200, 300, or 400.

An embodiment of the method may further include supporting the axially-aligned first and second central support pins 260, 360, or 436/460 within support holes of a support structure such as engine support plates 240 or 440.

In another embodiment of the method, supporting the first ends of the first pair of parallel metallic pins 230, 330, or 432 with one of the axially-aligned first central support pins 260, 360, or 460 may include attaching the first ends of the first pair of parallel metallic pins 230, 330, or 432 to extend from one side of a metallic plate 270, 370, or 470 and attaching the axially-aligned first central support pin 260, 360, or 460 to extend from a second side of the metallic plate 270, 370, or 470.

In a further embodiment of the method, supporting the second ends of the first pair of parallel metallic pins 230 or 330 with another of the axially-aligned first central support pins 260 or 360 comprises attaching the second ends of the first pair of parallel metallic pins 230 or 330 to extend from one side of a second metallic plate 270 or 370 and attaching the other axially-aligned first central support pin 260 or 360 to extend from a second side of the second metallic plate 270 or 370.

In yet another embodiment of the method, supporting the second ends of the first pair of parallel metallic pins 432 with another of the axially-aligned first central support pins 436 comprises forming the second ends of the first pair of parallel metallic pins 432 integrally with the other axially-aligned first central support pin 436.

In accordance with the present disclosure, support loads for a CMC BOAS attached using dual pin assemblies may be distributed to twice as many holes such that PIN Net Shear Section is approximately doubled and Net Shear stress is approximately halved.

Moreover, in accordance with the present disclosure, smaller diameter pins may be used, which permits smaller diameter holes in the rails. When these smaller holes are positioned with a lower edge next to the intermediate temperature zone as with prior systems, the smaller diameter of holes permits a larger distance e (increased by the difference in hole radius) from the center of hole to the top of rail, to further decrease the Net Shear stress.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) blade outer air seal (BOAS) assembly, comprising:

- a CMC BOAS including a base and a pair of rails having a substantially π-shaped cross-section, wherein the pair of rails include a first pair of aligned holes at a first end and second pair of aligned holes at a second end;
- a first pair of parallel metallic pins having a first end connected to a first central support pin and a second end connected to a second central support pin, respectively, wherein the first pair of parallel metallic pins are configured to engage the first pair of aligned holes; and
- a second pair of parallel metallic pins having a first end connected to a first central support pin and a second end connected to a second central support pin, respectively, wherein the second pair of parallel metallic pins are configured to engage the second pair of aligned holes.

2. The assembly of claim 1, wherein the respective first and second central support pins are aligned on a first axis and configured to rotate about the first axis when disposed in respective support holes.

3. The assembly of claim 2, wherein at least one of the first end and the second end of the first or second parallel metallic pins is attached to a support plate that is attached to one of the respective first and second central support pins.

4. The assembly of claim 3, wherein at least one of the first end and the second end of the first or second pair of parallel metallic pins is integrally attached to one of the respective first and second central support pins.

5. The assembly of claim 1, wherein the first and second pairs of parallel metallic pins are configured for rotation about their respective first and second central support pins.

6. A dual pin loaded blade outer air seal (BOAS), comprising:

- a ceramic matrix composite (CMC) BOAS base having a first end and a second end;
- a pair of CMC BOAS rails extending transversely from the CMC BOAS base, the CMC BOAS rails being substantially parallel and extending from the first end to the second end, with each CMC BOAS rail having a first pair of holes adjacent the first end and a second pair of holes adjacent the second end;
- a first metallic rotatable support engaging each of the first pair of holes; and a second metallic rotatable support engaging each of the second pair of holes, wherein each of the first and second rotatable metallic supports includes:

a first central support pin and a second central support pin disposed on a first axis, the first and second central support pins configured to rotate about the first axis when engaged within respective holes on a support;

a pair of parallel pins having a first end connected to the first central support pin and a second end connected to the second central support pin, respectively, wherein the pair of parallel pins are configured to engage a respective pair of holes in each CMC BOAS rail.

7. The apparatus of claim 6, wherein the pair of parallel pins have respective axes in a plane that includes the first axis.

8. The apparatus of claim 6, wherein at least one of the first end and the second end of the parallel pins is attached to a support plate that is attached to one of the first and second central support pins.

9. The apparatus of claim 8, wherein at least one of the first end and the second end of the parallel pins is integrally attached to one of the first and second central support pins.

10. The apparatus of claim 6, wherein the first end of the parallel pins is integrated with the first central support pin, the second end of the parallel pins is integrated with the second central support pin, and a joint is disposed on the parallel pins between the first and second ends.

11. The apparatus of claim 10, wherein the joint is selected from a group consisting of a welded joint, a braised joint, and a threaded joint.

12. The apparatus of claim 10, wherein each joint includes a coupling nut with oppositely threaded ends for engaging corresponding threads on a respective parallel pin section.

13. The apparatus of claim 6, wherein the first ends of the parallel pins are attached to a first support plate that is attached to the first central support pin, and the second ends of the parallel pins are attached to a second support plate that is attached to the second central support pin.

14. The apparatus of claim 13, wherein the parallel pins, support plates, and central support pins are attached to each other by welds.

15. The apparatus of claim 13, wherein the parallel pins, support plates, and central support pins are attached to each other by braised joints.

16. A method of supporting a ceramic matric composite (CMC) blade outer air seal (BOAS), the CMC BOAS having a substantially π-shaped cross-section with a base and a pair of rails, the method comprising:

providing an aligned pair of holes in first and second ends of the rails, the aligned pairs of holes being disposed outside of an intermediate temperature zone adjacent the base;

providing a first pair of parallel metallic pins extending through the aligned pair of holes in the first end of the rails;

providing a second pair of parallel metallic pins extending through the aligned pair of holes in the second end of the rails;

supporting the first and second ends of the first pair of parallel metallic pins with axially-aligned first central support pins; and supporting the first and second ends of the second pair of parallel metallic pins with axially-aligned second central support pins, wherein the axially-aligned first and second central support pins are disposed parallel to each other and are configured to permit rotation of the first and second pairs of parallel metallic pins in response to thermal bending of the CMC BOAS.

17. The method of claim 16, further comprising supporting the axially-aligned first and second central support pins within support holes of a support structure.

18. The method of claim 16, wherein supporting the first ends of the first pair of parallel metallic pins with one of the axially-aligned first central support pins comprises attaching the first ends of the first pair of parallel metallic pins to extend from one side of a metallic plate and attaching the axially-aligned first central support pin to extend from a second side of the metallic plate.

19. The method of claim 18, wherein supporting the second ends of the first pair of parallel metallic pins with another of the axially-aligned first central support pins comprises attaching the second ends of the first pair of parallel metallic pins to extend from one side of a second metallic plate and attaching the other axially-aligned first central support pin to extend from a second side of the second metallic plate.

20. The method of claim 18, wherein supporting the second ends of the first pair of parallel metallic pins with another of the axially-aligned first central support pins comprises forming the second ends of the first pair of parallel metallic pins integrally with the other axially-aligned first central support pin.

* * * * *